(12) United States Patent
Kim

(10) Patent No.: US 12,454,311 B2
(45) Date of Patent: Oct. 28, 2025

(54) STEER-BY-WIRE STEERING DEVICE AND METHOD FOR CONTROLLING THE SAME

(71) Applicant: HL MANDO CORPORATION, Gyeonggi-do (KR)

(72) Inventor: Taesik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 236 days.

(21) Appl. No.: 18/077,911

(22) Filed: Dec. 8, 2022

(65) Prior Publication Data

US 2023/0174150 A1 Jun. 8, 2023

(30) Foreign Application Priority Data

Dec. 8, 2021 (KR) .................... 10-2021-0174401

(51) Int. Cl.
*B62D 6/00* (2006.01)
*B62D 5/00* (2006.01)

(52) U.S. Cl.
CPC ............. *B62D 6/008* (2013.01); *B62D 5/006* (2013.01)

(58) Field of Classification Search
CPC .. B62D 5/0463; B62D 5/0481; B62D 15/025; B62D 6/002; B62D 6/006; B62D 6/008; B62D 6/08; B60W 10/20; B60W 30/02; B60W 10/04; B60W 10/18; B60W 10/22; B60W 2510/22; B60W 2520/125; B60W 2520/26; B60W 2552/40
See application file for complete search history.

(56) References Cited

U.S. PATENT DOCUMENTS

| | | | |
|---|---|---|---|
| 2002/0070070 A1* | 6/2002 | Andonian | B62D 6/008 180/402 |
| 2018/0319422 A1* | 11/2018 | Polmans | B62D 6/008 |
| 2019/0367084 A1* | 12/2019 | Hong | B62D 6/008 |
| 2020/0114960 A1* | 4/2020 | Kim | B62D 6/02 |
| 2023/0135320 A1* | 5/2023 | Jordan | B62D 1/16 74/495 |

OTHER PUBLICATIONS

JP-2013056563-A; Device for Applying Steering Resistance of Vehicle (Year: 2013).*

* cited by examiner

*Primary Examiner* — Adam D Tissot
*Assistant Examiner* — Aarron E Santos
(74) *Attorney, Agent, or Firm* — WOMBLE BOND DICKINSON (US) LLP

(57) ABSTRACT

According to the present embodiments, it is possible to enhance the driver's steering feel with a simplified structure, reduce components, save manufacturing and processing costs, and prevent overshoot to secure the driver's safety.

14 Claims, 6 Drawing Sheets

(a)　　　　　　　　　(b)

(a)

(b)

STEER-BY-WIRE STEERING DEVICE AND METHOD FOR CONTROLLING THE SAME

CROSS-REFERENCE TO RELATED APPLICATION

This application claims priority from Korean Patent Application No. 10-2021-0174401, filed on Dec. 8, 2021, which is hereby incorporated by reference for all purposes as if fully set forth herein.

BACKGROUND

Field

The present embodiments relate to a steer-by-wire steering device and a method for controlling the same and, more specifically, to a steer-by-wire steering device and a method for controlling the same, which may enhance the driver's steering feel with a simplified structure, reduce the number of components, save processing costs, and prevent overshoot to secure the driver's safety.

Description of Related Art

A steer-by-wire steering device is a kind of electromotive steering device that steers the vehicle using electric power without any mechanical connection, such as a steering column or universal joint, between the steering wheel and the front wheel steering device.

In other words, the driver's steering wheel manipulation is converted into an electrical signal that is the received by the electronic control device to thereby determine the motor output. Such a steer-by-wire system has no mechanical linkage, reducing injury to the driver due to a mechanical part in a crash. Further, the possibility of reducing or eliminating hydraulic parts or mechanical linkage may reduce components, leading to a lightweight vehicle and simplification of line processes. Thus, it is possible to reduce unnecessary energy consumption during steering and enhance fuel efficiency. Further, it is possible to achieve ideal steering performance by ECU programming.

A steer-by-wire steering device has no mechanical linkage between the steering shaft and the wheels. Thus, an appropriate steering reaction force needs to be generated to the steering wheel during steering to give the driver a steering feel similar to that obtained from the legacy steering system.

The conventional steer-by-wire steering device generates a steering reaction force by providing a motor to apply torque to the steering shaft and controlling the output of the motor. However, such a structure requires a reducer between the motor and the steering shaft, resulting in an increase in the size of the steering device and manufacturing and processing costs.

BRIEF SUMMARY

The present embodiments have been conceived in the foregoing background and relate to a steer-by-wire steering device and a method for controlling the same, which may enhance the driver's steering feel with a simplified structure, reduce the number of components, save processing costs, and prevent overshoot to secure the driver's safety.

According to the present embodiments, there may be provided a steer-by-wire steering device, comprising a steering shaft rotated by rotation of a steering wheel, a moving member axially moved by rotation of the steering shaft, a first stopper and a second stopper provided on two opposite sides of the moving member, a first elastic member and a second elastic member, respectively, provided between the moving member and the first stopper and between the moving member and the second stopper, a supporting member supported by the moving member to axially provide a frictional force when the moving member is moved, an angle sensor detecting a steering angle of the steering wheel, and a controller controlling the supporting member to adjust the frictional force according to the steering angle of the steering wheel.

According to the present embodiments, there may be provided a method for controlling a steer-by-wire steering device comprising a steering shaft rotated by rotation of a steering wheel, a moving member axially moved by rotation of the steering shaft, a first stopper and a second stopper provided on two opposite sides of the moving member, a first elastic member and a second elastic member, respectively, provided between the moving member and the first stopper and between the moving member and the second stopper, a supporting member supported by the moving member to axially provide a frictional force when the moving member is moved, an angle sensor detecting a steering angle of the steering wheel, and a controller controlling the supporting member to adjust the frictional force according to the steering angle of the steering wheel, comprising sensing the steering angle of the steering wheel by the angle sensor and controlling, by the controller, the supporting member to adjust the frictional force according to the sensed steering angle.

According to the present embodiments, it is possible to enhance the driver's steering feel with a simplified structure, reduce components, save manufacturing and processing costs, and prevent overshoot to secure the driver's safety.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
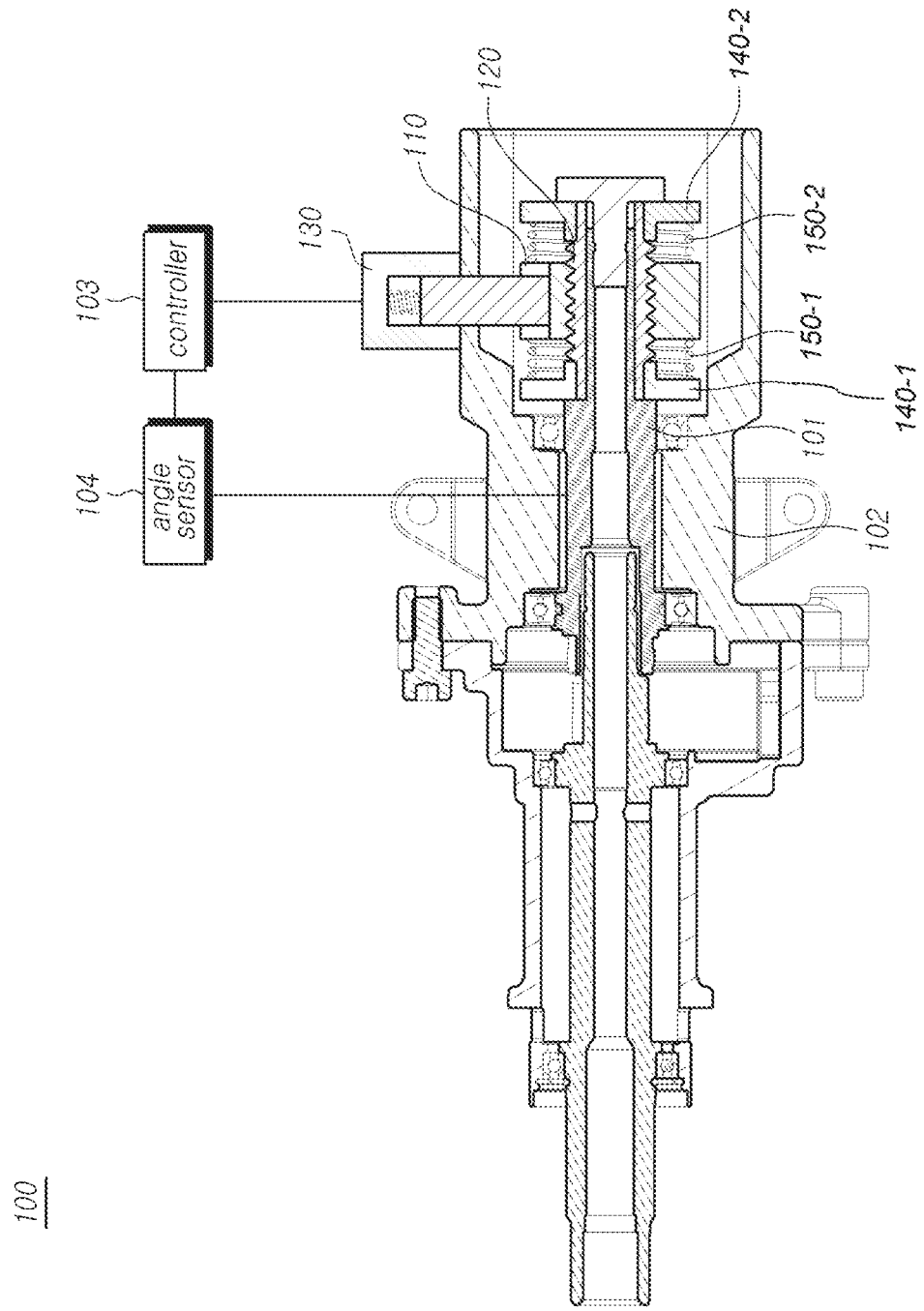
FIG. 1 is a cross-sectional view illustrating a steer-by-wire steering device according to the present embodiments.

In the following description of examples or embodiments of the present disclosure, reference will be made to the accompanying drawings in which it is shown byway of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
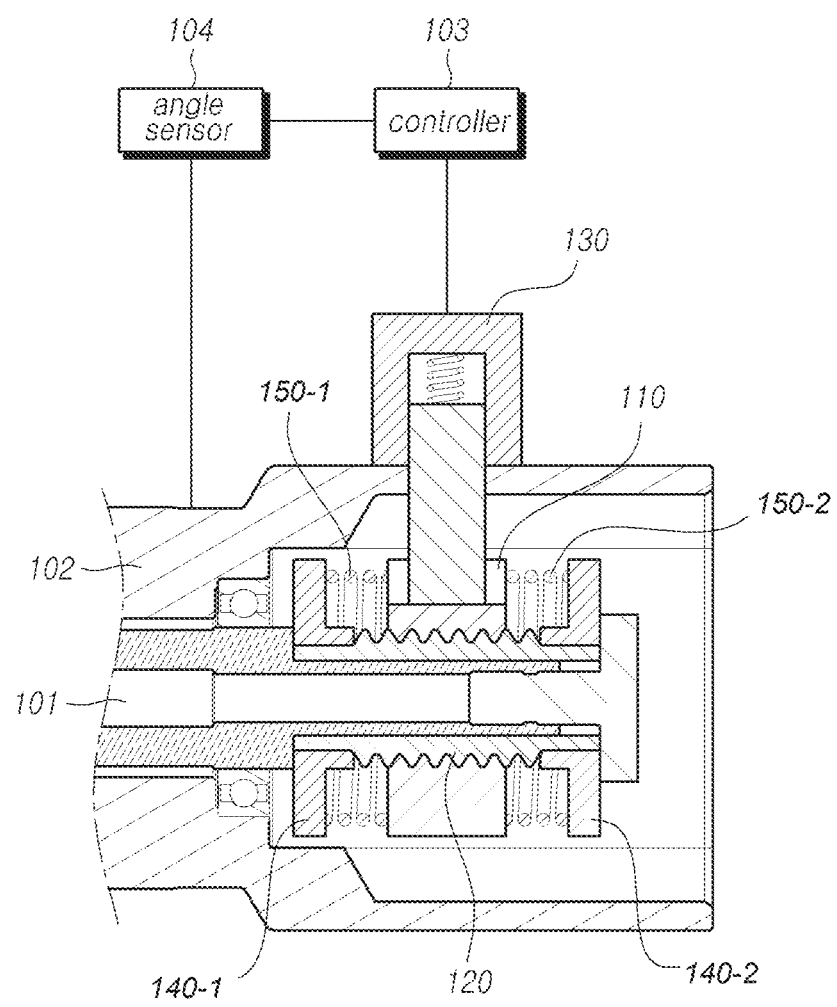
FIG. 2 is an enlarged view of a portion of FIG. 1.
Figure 3:
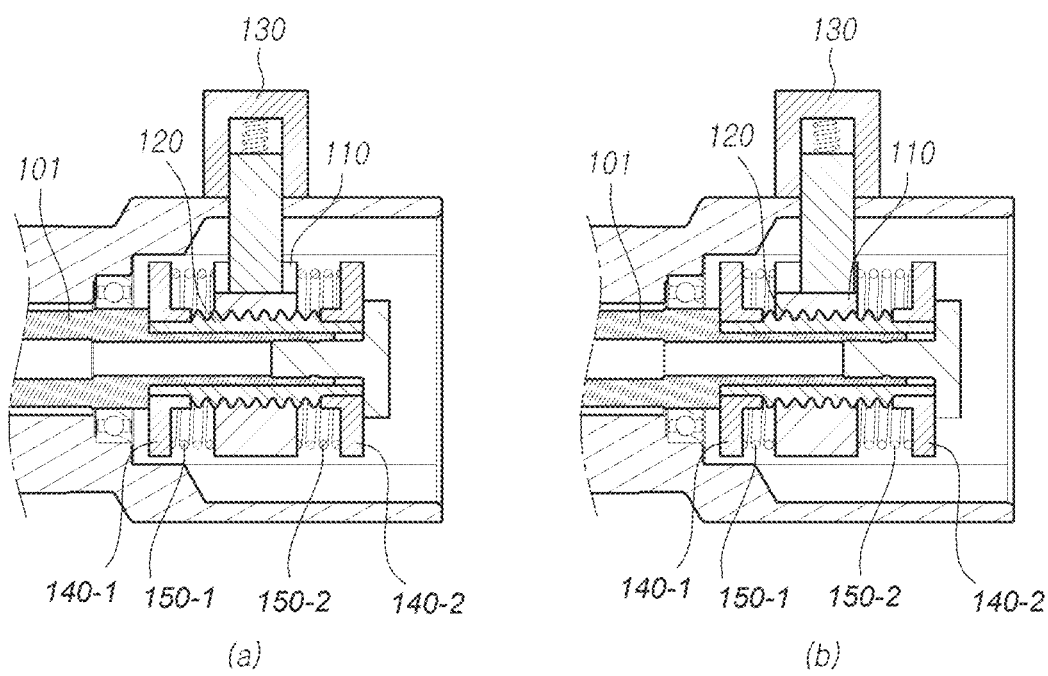
FIGS. 3 and 4 are cross-sectional views illustrating an operational state of a steer-by-wire steering device according to the present embodiments.
Figure 4:
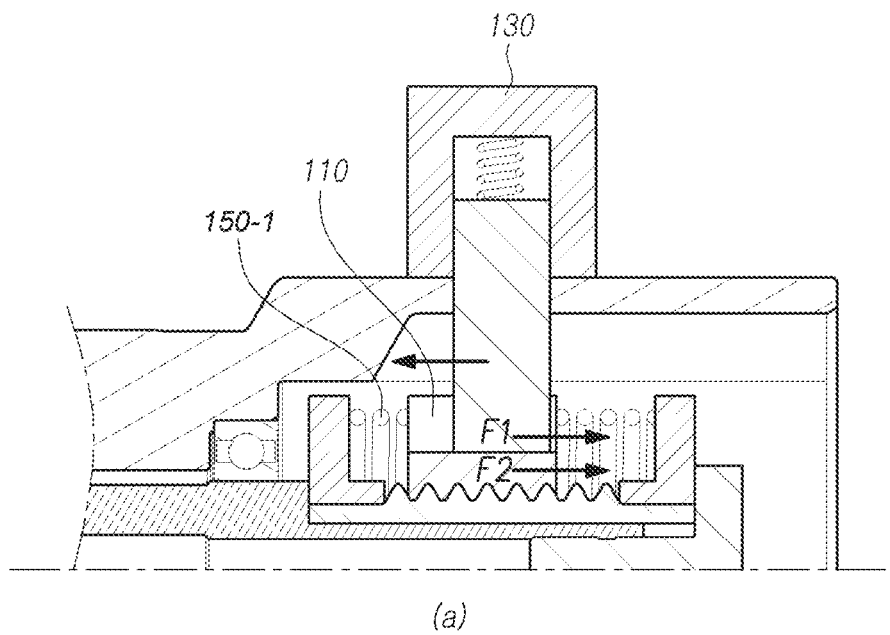
Figure 4:
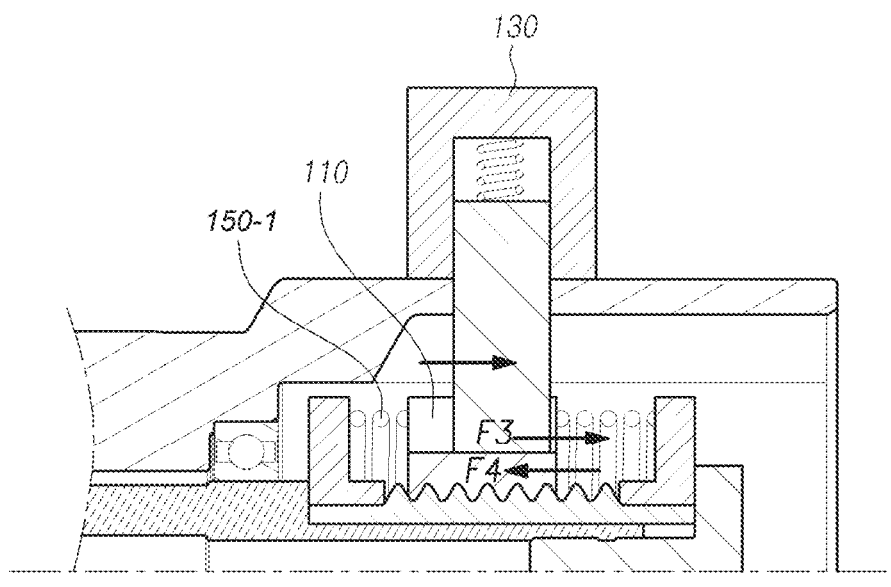
Figure 5:
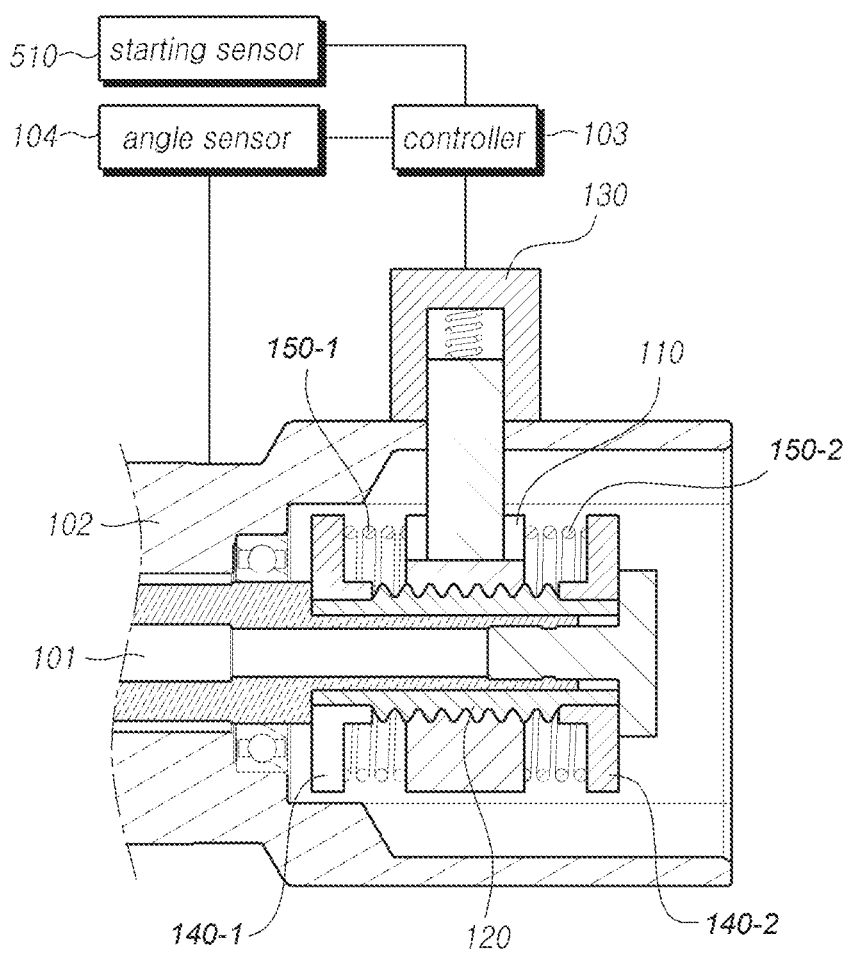
FIG. 5 is a cross-sectional view illustrating a steer-by-wire steering device according to the present embodiments.
Figure 6:
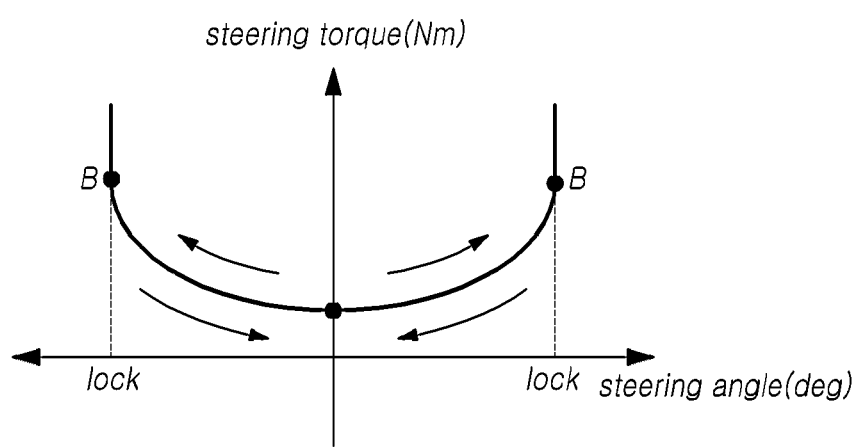
FIG. 6 is a graph illustrating the steering torque according to the steering angle of a steering wheel.

FIG. 1 is a cross-sectional view illustrating a steer-by-wire steering device according to the present embodiments. FIG. 2 is an enlarged view of a portion of FIG. 1. FIGS. 3 and 4 are cross-sectional views illustrating an operational state of a steer-by-wire steering device according to the present embodiments. FIG. 5 is a cross-sectional view illustrating a steer-by-wire steering device according to the present embodiments. FIG. 6 is a graph illustrating the steering torque according to the steering angle of a steering wheel.

According to the present embodiments, a steer-by-wire steering device 100 may comprise a steering shaft 101 rotated by rotation of a steering wheel (not shown), a moving member 110 axially moved by rotation of the steering shaft 101, a first stopper 140-1 and a second stopper 140-2 provided on two opposite sides of the moving member 110, a first elastic member 150-1 and a second elastic member 150-2, respectively, provided between the moving member 110 and the first stopper 140-1 and between the moving member and the second stopper 140-2, a supporting member 130 supported by the moving member 110 to axially provide a frictional force when the moving member 110 is moved, an angle sensor 104 detecting a steering angle of the steering wheel, and a controller 103 controlling the supporting member 130 to adjust the frictional force according to the steering angle of the steering wheel.

A description is made below with reference to FIGS. 1 and 2. The steering shaft 101 is rotated according to the driver's manipulation of the steering wheel, and the moving member is axially moved by the rotation of the steering shaft 101. The first stopper 140-1 and the second stopper 140-2, respectively, are provided on two opposite sides of the moving member 110, so that the rotation of the steering shaft 101 is restricted and the maximum rotational angle is determined as the moving member 110 is supported by the stopper 140-1, 140-2.

According to an embodiment, the steer-by-wire steering device 100 according to the present embodiments may further include a screw member 120 coupled to the steering shaft 101, and the moving member 110 may be screwed with the screw member 120. In other words, as shown in the drawings, the screw member 120 may be formed to be hollow and be coupled to the outer circumferential surface of the steering shaft 101, and the moving member 110 may be screwed to the screw formed on the outer circumferential surface of the screw member 120. As the rotation of the moving member 110 is restricted, the moving member 110 may be axially moved by the rotation of the steering wheel. According to an embodiment, the supporting member 130 may be circumferentially supported on the moving member 110, restricting rotation of the moving member 110. For example, a groove may be axially formed in the outer circumferential surface of the moving member 110, and the supporting member 130 may be inserted into the groove of the moving member 110 and be circumferentially supported on the moving member 110.

According to an embodiment, the first and second stoppers 140-1 and 140-2, respectively, may be provided on two opposite ends of the screw member 120 in the axial direction. Therefore, the range of the axial movement of the moving member 110 is limited to the distance between the first and second stoppers 140-1 and 140-2 on the screw member 120, and the rotational angle of the steering wheel is limited to a range corresponding to the movement range of the moving member 110.

The first and second elastic members 150-1 and 150-2 are provided between the moving member 110 and the first and second stoppers 140-1 and 140-2. In other words, the first elastic member 150-1 may be provided between the moving member 110 and the first stopper 140-1 positioned on one side of the moving member 110 in the axial direction, and the second elastic member 150-2 may be provided between the moving member 110 and the second stopper 140-2 positioned on the other side of the moving member 110 in the axial direction. Accordingly, when the moving member 110 is axially moved according to the rotation of the steering wheel, the first and second elastic members 150-1 and 150-2 may be compressed and/or extended, applying elastic force to the moving member 110. The first and second elastic members 150-1 and 150-2 may be, e.g., springs.

The supporting member 130 is supported on the moving member 110, so that when the moving member 110 is axially moved, frictional force may be axially provided due to contact with the supporting member 130. As shown in the drawings, the supporting member 130 may be coupled to a housing 102 for receiving the steering shaft 101 and be fixed in the axial direction. In other words, when the moving member 110 is axially moved by the rotation of the steering wheel, elastic force by the first and second elastic members 150-1 and 150-2 and frictional force by the supporting member 130 may be applied to the moving member 110, and the elastic force and frictional force cause a steering reaction force to provide a steering feel to the driver.

The controller 103 may control the supporting member 130 to adjust the magnitude of the frictional force generated due to contact with the supporting member 130 when the moving member 110 is moved. As the controller 103 adjusts the magnitude of the frictional force applied to the moving member 110 according to the steering angle of the steering wheel sensed by the angle sensor 104, an appropriate steering reaction force may be provided to the driver to enhance steering feel according to the steering angle of the steering wheel. The angle sensor 104 may sense the rotational angle of the steering shaft 101, deriving the steering angle of the steering wheel.

The controller 103 may control the degree of pressurization to the moving member 110 by the supporting member 130, thereby adjusting the magnitude of the frictional force applied to the moving member 110. As shown in the drawings, the supporting member 130 may be provided to be radially supported on the moving member 110, and the controller 103 may adjust the magnitude of the force of the supporting member 130 radially pressurizing the moving member 110, thereby adjusting the magnitude of the frictional force. According to an embodiment, the supporting member 130 may be a solenoid. In other words, the supporting member 130 may be a solenoid with a load part supported on the moving member 110, and the controller 103 may adjust the magnitude of the frictional force applied to the moving member 110 by increasing or decreasing the magnitude of the current applied to the solenoid.

As elastic force and frictional force are so provided to the moving member 110 which is axially moved according to the rotation of the steering wheel, the driver may be provided an appropriate steering feel. In particular, as compared with a conventional steering device including a motor and a reducer, the steering device according to the present embodiments may enhance the driver's steering feel even with a further simplified structure, reducing components and saving manufacturing and processing costs.

FIG. 6 is an example graph illustrating the driver's steering torque according to the steering angle of the steering wheel. In general, as shown in the drawings, when the steering angle of the steering wheel is small, a light steering feel may be provided so that the steering wheel may be rotated even with low steering torque and, when the steering angle of the steering wheel is large, a heavy steering feel may be provided so that high steering torque is required to rotate the steering wheel. A method for providing a steering reaction force by a steer-by-wire steering device 100 according to the present embodiments is described below.

(a) of FIG. 3 illustrates a state in which the steering wheel is in a neutral position. As the steering wheel is in the neutral position, the moving member 110 is positioned in the middle of the first and second stoppers 140-1 and 140-2. While the moving member 110 is positioned in the middle of the first and second stoppers 140-1 and 140-2, the first and second elastic members 150-1 and 150-2 on two opposite sides may be positioned in a compressed state. The elastic forces provided by the compressed first and second elastic members 150-1 and 150-2 to the moving member 110 may cancel each other but, if the steering wheel is rotated so that the moving member 110 is axially moved, either the first elastic member 150-1 or the second elastic member 150-2 may further be compressed, applying elastic force to the moving member 110 and thus providing a steering feel to the driver.

According to an embodiment, the controller 103 may control the supporting member 130 to allow the frictional force, applied to the moving member 110 in the neutral position of the steering wheel, to be zero. In other words, when the steering wheel reaches the neutral position or when the steering wheel starts to rotate from the neutral position, only the elastic force by the compression and/or extension of the first and second elastic members 150-1 and 150-2 is first provided to the moving member 110. The controller 103 may control the supporting member 130 to provide a frictional force by contact with the supporting member 130 to the moving member 110 as the steering angle of the steering wheel increases. Accordingly, a small second rotational angle is generated in the neutral position of the steering wheel, providing a light steering feel to the driver (see A of FIG. 6).

(b) of FIG. 3 illustrates a state in which the steering wheel is rotated off the neutral position, so that the moving member 110 approaches either the first stopper 140-1 or the second stopper 140-2 (left side of the figure) while getting away from the other (right side of the figure). Therefore, the elastic member between the moving member 110 and the stopper closer to the moving member 110 is compressed, providing elastic force to the moving member 110. Further, the elastic member between the moving member 110 and the stopper farther from the moving member 110 may be extended, providing elastic force to the moving member 110.

According to an embodiment, the controller 103 may control the supporting member 130 to increase frictional force applied to the moving member 110 as the steering angle of the steering wheel increases. In other words, if the steering wheel is off the neutral position so that the steering angle increases, the controller 103 may control the supporting member 130 to further pressurize the moving member 110, increasing the frictional force applied to the moving member 110. (a) of FIG. 4 shows the moving direction of the moving member 110 and the elastic force F1 and frictional force F2 applied to the moving member 110 when the steering angle of the steering wheel increases. As shown in the drawings, when the steering angle of the steering wheel is increased, the elastic force F1 and the frictional force F2 both act in the direction opposite to the moving direction of the moving member 110. Accordingly, the sum F1+F2 of the elastic force and the frictional force may be provided to the moving member 110 and, as the steering angle of the steering wheel increases, a large steering reaction force may be generated, providing a heavy steering feel to the driver (see A→B of FIG. 6).

Further, according to an embodiment, the controller 103 may control the supporting member 130 to reduce the frictional force applied to the moving member 110 as the steering angle of the steering wheel reduces to return to the neutral position. In other words, when the steering wheel returns from a non-neutral position to the neutral position, the controller 103 may reduce the degree of pressurization to the moving member 110 by the supporting member 130 according to the steering angle of the steering wheel. (b) of FIG. 4 shows the moving direction of the moving member 110 and the elastic force F3 and frictional force F4 applied to the moving member 110 when the steering angle of the steering wheel decreases. As shown in the drawings, when the steering angle of the steering wheel is decreased, the elastic force F3 acts in the same direction as the moving direction of the moving member 110, but the frictional force F4 acts in the direction opposite to the moving direction of the moving member 110. Therefore, the difference F3-F4 between the elastic force and the frictional force may be provided to the moving member 110, so that overshoot, i.e., an abrupt reduction in the steering angle due to the elastic force of the elastic member 150-1. 150-2 when the steering angle of the steering wheel decreases, may be prevented, securing the driver's safety.

Referring to FIG. 5, the steer-by-wire steering device 100 according to the present embodiments may further include a starting sensor 510 for detecting the starting state of the vehicle. The controller 103 may control the supporting member 130 to provide frictional force to the moving member 110 until the steering wheel reaches the neutral position when the vehicle engine is turned off in a non-neutral position state of the steering wheel. In other words, in an example case the driver turns off the engine while the steering wheel is not in the neutral position after driving or parking, if no frictional force is provided to the moving member 110, the steering wheel may be abruptly rotated to the neutral position by the elastic force of the elastic member 150-1. 150-2. To prevent this issue, the controller 103 may control the supporting member 130 to provide frictional force to the moving member 110 until the steering wheel reaches the neutral position when detecting engine-off and non-neutral position of the steering wheel from the angle sensor 104 and the starting sensor 510. According to an embodiment, the controller 103 may control the supporting member 130 to provide frictional force to the moving member 110 for a predetermined time (e.g., three seconds). Therefore, it is possible to prevent overshoot and secure the driver's safety.

A method for controlling a steer-by-wire steering device according to the present embodiments is described below.

According to the present embodiments, there is provided a method for controlling a steer-by-wire steering device comprising a steering shaft 101 rotated by rotation of a steering wheel, a moving member 110 axially moved by rotation of the steering shaft 101, a first stopper 140-1 and a second stopper 140-2 provided on two opposite sides of the moving member 110, a first elastic member 150-1 and a second elastic member 150-2, respectively, provided between the moving member 110 and the first stopper 140-1 and between the moving member and the second stopper 140-2, a supporting member 130 supported by the moving member 110 to axially provide a frictional force when the moving member 110 is moved, an angle sensor 104 detecting a steering angle of the steering wheel, and a controller 103 controlling the supporting member 130 to adjust the frictional force according to the steering angle of the steering wheel, comprising sensing the steering angle of the steering wheel by the angle sensor 104 and controlling, by the controller 103, the supporting member 130 to adjust the frictional force applied to the moving member 110 according to the sensed steering angle.

According to an embodiment, the controller 103 may control the supporting member 130 to allow the frictional force, applied to the moving member 110 when the steering wheel is in a neutral position, to be zero.

According to an embodiment, the controller 103 may control the supporting member 130 to increase frictional force applied to the moving member 110 as the steering angle of the steering wheel increases.

According to an embodiment, the controller 103 may control the supporting member 130 to reduce the frictional force as the steering angle of the steering wheel reduces to return to the neutral position.

According to an embodiment, the method further includes detecting a starting state of the vehicle. The controller 103 may control the supporting member 130 to provide frictional force to the moving member 110 until the steering wheel reaches the neutral position when the vehicle engine is turned off in a non-neutral position state of the steering wheel.

By the so-shaped steer-by-wire steering device and the method for controlling the same, it is possible to enhance the driver's steering feel with a simplified structure, reduce components, save manufacturing and processing costs, secure the driver's safety, and prevent overshoot.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer-by-wire steering device, comprising:
   a steering shaft rotated by rotation of a steering wheel;
   a moving member axially moved by rotation of the steering shaft;
   a first stopper and a second stopper provided on two opposite sides of the moving member;
   a first elastic member and a second elastic member, respectively, provided between the moving member and the first stopper and between the moving member and the second stopper;
   a supporting member supported by the moving member to axially provide a frictional force when the moving member is moved;
   an angle sensor detecting a steering angle of the steering wheel; and
   a controller controlling the supporting member to adjust the frictional force according to the steering angle of the steering wheel,
   wherein the controller is configured to control the supporting member to allow the frictional force to be zero when the steering wheel is in a neutral position.

2. The steer-by-wire steering device of claim 1, further comprising a screw member coupled to the steering shaft,
   wherein the moving member is screwed with the screw member.

3. The steer-by-wire steering device of claim 2, wherein the first stopper and the second stopper, respectively, are provided at two opposite ends of the screw member in an axial direction.

4. The steer-by-wire steering device of claim 1, wherein the supporting member comprises a solenoid.

5. The steer-by-wire steering device of claim 1, wherein the controller controls the supporting member to allow the frictional force to be zero in a neutral position of the steering wheel.

6. The steer-by-wire steering device of claim 1, wherein the controller controls the supporting member to increase the frictional force as the steering angle of the steering wheel increases.

7. The steer-by-wire steering device of claim 1, wherein the controller controls the supporting member to reduce the frictional force as the steering angle of the steering wheel decreases so that the steering wheel returns to a neutral position.

8. The steer-by-wire steering device of claim 1, further comprising a starting sensor for detecting a starting state of a vehicle,
wherein the controller controls the supporting member to provide the frictional force until the steering wheel reaches a neutral position when the vehicle engine is turned off while the steering wheel is not in the neutral position.

9. A method for controlling a steer-by-wire steering device comprising a steering shaft rotated by rotation of a steering wheel, a moving member axially moved by rotation of the steering shaft, a first stopper and a second stopper provided on two opposite sides of the moving member, a first elastic member and a second elastic member, respectively, provided between the moving member and the first stopper and between the moving member and the second stopper, a supporting member supported by the moving member to axially provide a frictional force when the moving member is moved, an angle sensor detecting a steering angle of the steering wheel, and a controller controlling the supporting member to adjust the frictional force according to the steering angle of the steering wheel, the method comprising:
sensing the steering angle of the steering wheel by the angle sensor; and
controlling, by the controller, the supporting member to adjust the frictional force according to the sensed steering angle,
wherein the controlling of the supporting member comprises controlling the supporting member to allow the frictional force to be zero when the steering wheel is in a neutral position.

10. The method of claim 9, wherein the controller controls the supporting member to allow the frictional force to be zero when the steering wheel is in a neutral position.

11. The method of claim 9, wherein the controller controls the supporting member to increase the frictional force as the steering angle of the steering wheel increases.

12. The method of claim 9, wherein the controller controls the supporting member to reduce the frictional force as the steering angle of the steering wheel decreases so that the steering wheel returns to a neutral position.

13. The method of claim 9, further comprising detecting a starting state of a vehicle,
wherein the controller controls the supporting member to provide the frictional force until the steering wheel reaches a neutral position when the vehicle engine is turned off while the steering wheel is not in the neutral position.

14. The steer-by-wire steering device of claim 1, wherein the controller is configured to detect a starting state of a vehicle and control the supporting member to provide the frictional force until the steering wheel reaches a neutral position when the vehicle engine is turned off while the steering wheel is not in the neutral position.

* * * * *